A. C. SARGENT.
FAN SHAFT.
APPLICATION FILED JUNE 21, 1916.
1,200,881.
Patented Oct. 10, 1916.
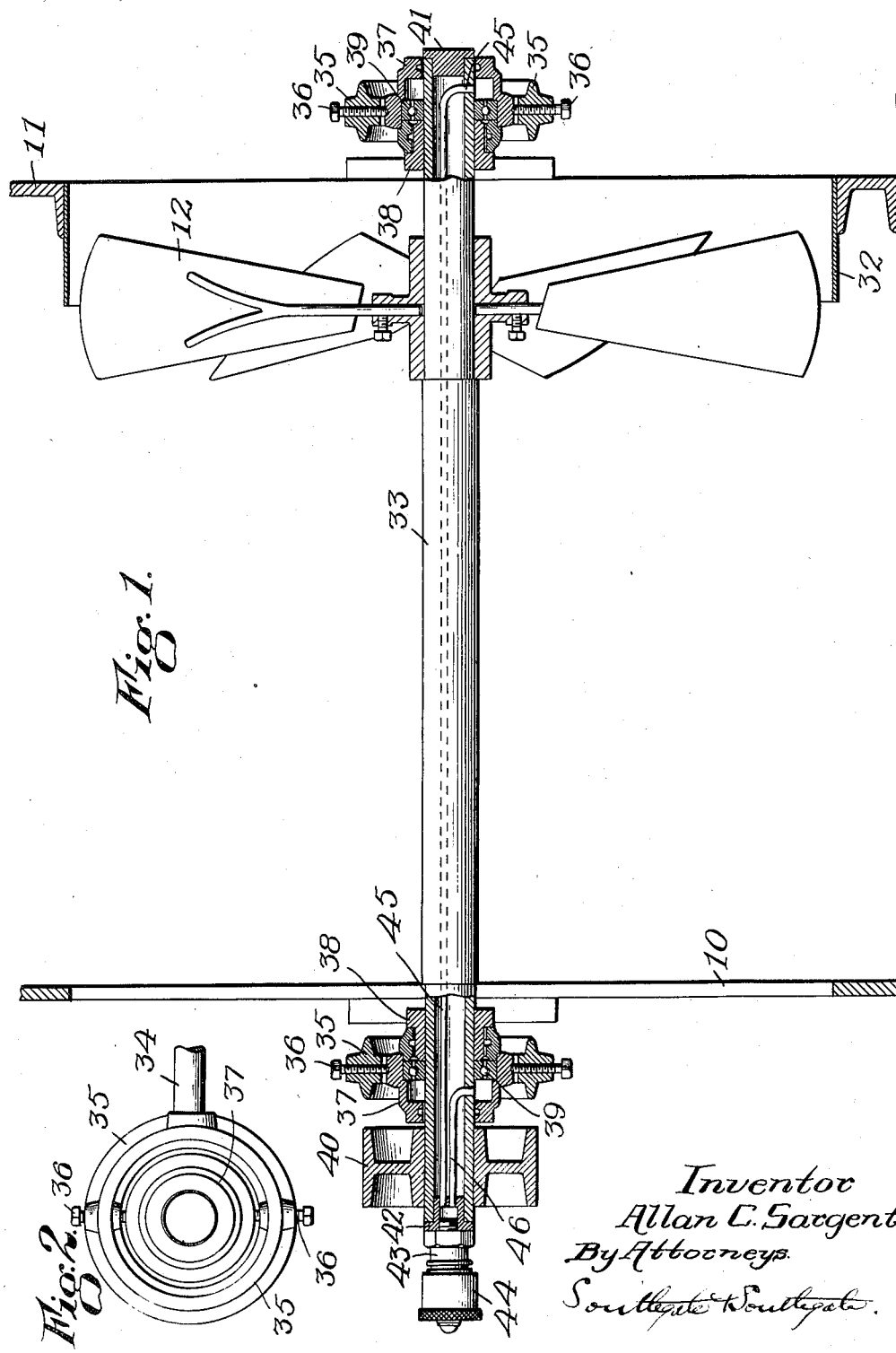
Inventor
Allan C. Sargent.
By Attorneys
Southgate & Southgate.

UNITED STATES PATENT OFFICE.

ALLAN C. SARGENT, OF WESTFORD, MASSACHUSETTS, ASSIGNOR TO C. G. SARGENT'S SONS CORPORATION, OF GRANITEVILLE, MASSACHUSETTS, A CORPORATION OF MASSACHUSETTS.

FAN-SHAFT.

1,200,881.  Specification of Letters Patent.  Patented Oct. 10, 1916.

Application filed June 21, 1916. Serial No. 105,062.

*To all whom it may concern:*

Be it known that I, ALLAN C. SARGENT, a citizen of the United States, residing at Westford, in the county of Middlesex and State of Massachusetts, have invented a new and useful Fan-Shaft, of which the following is a specification.

This invention relates to a hollow shaft for a fan for drying and ventilating purposes and constitutes an improvement over the form shown in my Patent No. 1,012,018 granted Dec. 19, 1911.

The principal objects of this invention are to provide a hollow shaft of considerable length which will not vibrate unduly during the operation of this fan at high speeds; to provide improved means for supporting it and improved means for lubricating the bearings.

Reference is to be had to the accompanying drawings in which:

Figure 1 is an elevation of a hollow fan shaft constructed in accordance with this invention, certain parts being shown in longitudinal central section, and Fig. 2 is an end view of the shaft and supporting means therefor.

The invention is shown as applied to a wool drying machine having an outer wall or partition 10 and an inner inaccessible wall or partition 11, both of them perforated. In the present form the perforation of the partition 10 is about the diameter of a fan 12 which is mounted on a hollow shaft 33 which extends through both perforations. The perforation in the wall 11 is shown as provided with a circular guard 32. Instead of having a double arrangement as in my prior patent in which the shaft contains within it a stationary supporting tube, I secure the necessary strength and rigidity, and in fact a higher degree of the same than in that case, by making this shaft of double extra strong pipe so that the walls are of comparatively great thickness, and I do not then use the interior tube nor the ball bearings inside the pipe.

In order to support the shaft rigidly so that the alinement of its bearings will be uniform and constant supports 34 are provided carrying rings 35 which are tapped for two opposite pivot screws 36. These screws are shown as in vertical position. By these pivot screws are carried in each instance one-half 37 of an external ball bearing. In this way they are capable of adjustment to get them into proper alinement, and furthermore there is no difficulty about alining the two members 37 at the two ends of the shaft because each of them is free to turn on a vertical axis. The other members 38 of the ball bearing are fixed to the shaft and the usual ball races 39 are introduced, as will be obvious.

The shaft carries a driving pulley 40 on its end beyond the outer support. It will be understood that the two bearings are the same, one of them on the outside of the frame near the pulley being readily accessible, while the other one on the inner side of the wall 11 is practically inaccessible, after the parts are mounted. For the purpose of lubricating these bearings, the shaft 33 is provided with a plug 41 at one end and with a cup 42 at the other end which plug up the two ends of the shaft. On this cup 42 is screwed a grease cup, as for example, a Powell "Coin" grease cup 43. I have not shown the details of construction of this cup as the type above mentioned is well known, and any other type can be employed, but it has a cap 44 which can be screwed up on the main member for the purpose of forcing the grease under pressure into the body of the cup 42. This is provided with two perforations having two pipes 45 and 46, one extending to each bearing and of course passing through the center of the hollow shaft. In this way the bearings can be lubricated from the outer end without the use of the feed oilers shown in my above mentioned patent. It will be seen therefore that the grease cup is more firmly located in position than in the other case, that only one is required for the two lubricating operations, and that it is cheaper and simpler. Furthermore, by using the single double extra strong pipe a very rigid construction is provided which will stand long usage at high speeds.

Although I have illustrated and described only a single embodiment of the invention and shown it as applied only to a single type of machine, I am aware of the fact that it is capable of more general use and that modifications can be made in the details of construction without departing from the scope of the invention as expressed in the claims.

Therefore I do not wish to be limited to all the details of construction herein disclosed, and described, but

What I claim is:—

1. The combination with a hollow shaft, ball bearings outside said shaft for supporting it, a cup secured in and closing one end of the shaft, a grease cup secured to said cup in axial alinement therewith and having means for forcing grease into the first named cup, and two tubes leading from the interior of the first name cup, one to each bearing, through the wall of said hollow shaft.

2. The combination of a fan shaft having two supports at opposite ends, each of said supports comprising a ring, a pair of pivot screws carried by each of said rings, the pivot screws of the two rings having their axes parallel with each other, a ball bearing member supported by the pivot screws of each ring so as to be capable of turning on them, a second ball bearing member fixed to the shaft and coöperating with the first one, ball bearing rings between said members, and a single lubricating means axially arranged at the end of said shaft and supported thereby for supplying lubricant to both of the ball bearings.

In testimony whereof I have hereunto affixed my signature.

ALLAN C. SARGENT.